United States Patent [19]

Hartmann et al.

[11] 4,260,640

[45] Apr. 7, 1981

[54] MOULDING FOOD PRODUCTS

[75] Inventors: Karl Hartmann, Bremerhaven; Klaus Bartels, Langen; Erich Kraffert, Nieder-Olm, all of Fed. Rep. of Germany

[73] Assignee: Lever Brothers Company, New York, N.Y.

[21] Appl. No.: 895,826

[22] Filed: Apr. 13, 1978

Related U.S. Application Data

[63] Continuation-in-part of Ser. No. 795,829, May 11, 1977, abandoned, which is a continuation of Ser. No. 701,911, Jul. 1, 1976, abandoned, which is a continuation of Ser. No. 593,152, Jul. 3, 1975, abandoned, which is a continuation of Ser. No. 281,870, Aug. 12, 1972, abandoned.

[30] Foreign Application Priority Data

Aug. 24, 1971 [DE] Fed. Rep. of Germany ....... 2142341

May 5, 1972 [DE] Fed. Rep. of Germany ....... 2222205

[51] Int. Cl.$^2$ ............................................... A23L 3/36
[52] U.S. Cl. .................................... 426/516; 426/524
[58] Field of Search ................ 426/512, 513, 516, 524

[56] References Cited

U.S. PATENT DOCUMENTS

| | | | |
|---|---|---|---|
| 2,020,843 | 11/1935 | Lohner | 426/513 |
| 3,615,686 | 10/1971 | Marshall | 426/512 |

*Primary Examiner*—Hiram H. Bernstein
*Attorney, Agent, or Firm*—James J. Farrell; Melvin H. Kurtz; Michael J. Kelly

[57] ABSTRACT

A method and apparatus for forming slabs and shaped bars of food material such as fish or meat. The material is extruded at a very high pressure while deep frozen and via an extrusion nozzle which is shaped to build up back pressure to improve uniformity of extrusion.

4 Claims, 7 Drawing Figures

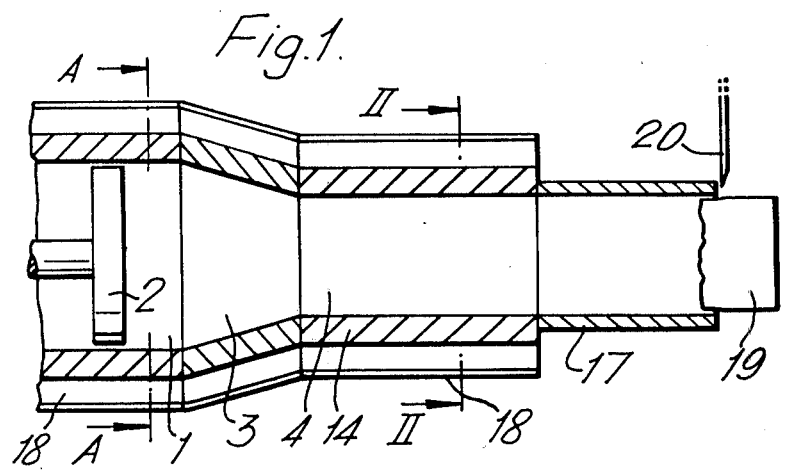
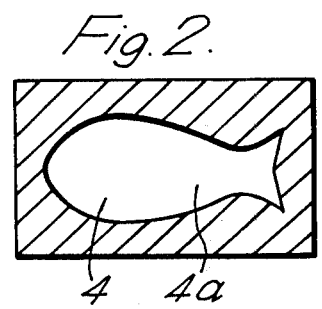
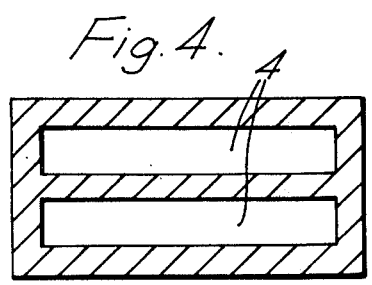
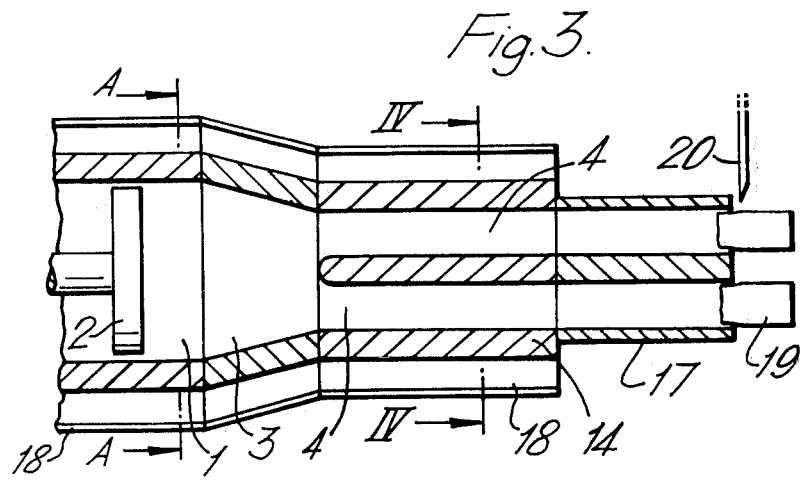

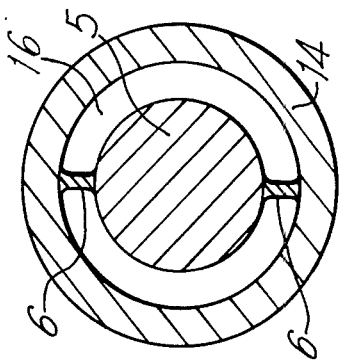
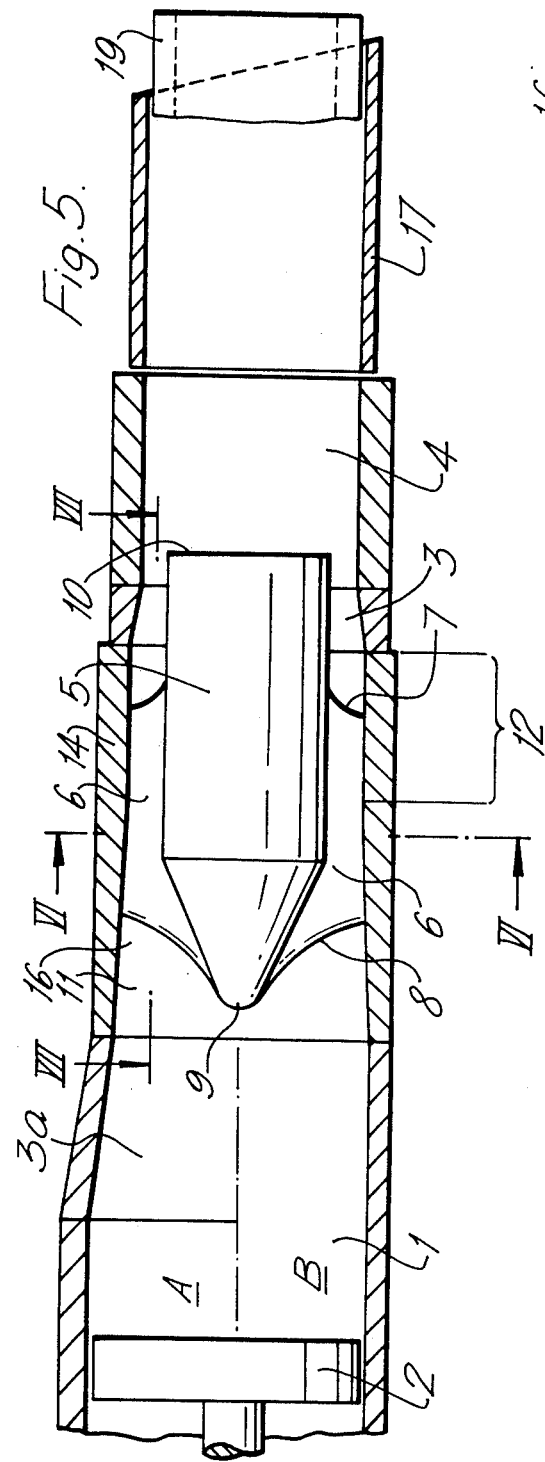

MOULDING FOOD PRODUCTS

This application is a continuation-in-part application of application Ser. No. 795,829, filed May 11, 1977, which is a continuation of application Ser. No. 701,911, filed July 1, 1976, which in turn is a continuation of application Ser. No. 593,152, filed July 3, 1975, which is a continuation of parent application Ser. No. 281,870, filed Aug. 12, 1972, all of which are now abandoned.

The invention relates to the moulding of food products by extrusion and particularly to apparatus and methods for the production of shaped frozen portions of meat or fish such as the so-called fish fingers, fish sticks and similar unit portions of fish or meat.

It has previously been proposed in U.S. Pat. No. 2,916,986 to shape quick-frozen foods, particularly fish, by extrusion at temperatures below $-10°$ C. into strips which can be further sub-divided into "fish fingers" or "fish sticks". In the processing of lean fish (i.e. fish of low fat content) it is usual to maintain a temperature between $-5°$ and $-15°$ C. and in the processing of fat fish a temperature between $-10°$ and $-30°$ C. It is inevitable with this method, however, that the bar of quick-frozen food emerging from the extruder differs in degree of compression at various times and places, which has the particular disadvantage that the bar does not emerge evenly or straight and, depending on the degree of compression, has a greater or lesser number of cracks. There is also the disadvantage that individual portions produced by cutting pieces of the same length from the bar have different weights. As far as applicants are aware this process has not been applied on any significant commercial scale; and this is possible because of the above stated disadvantages.

It has also been proposed in recently published French Pat. Nos. 2,056,496 and 2,061,355 to avoid these disadvantages by directly pressing the bars of quick-frozen fish. Frozen material is forced out at a high pressure of about 100 atm. (gauge) or more in the material being compressed into pressure resistant channels and up against an end plate. This end plate combination is essential to the invention of these patents to insure that the food is uniformly subjected to a constant pressure build up. This avoids otherwise uncontrollable pressure deviations resulting from variations in density and structure as the food contacts the various openings of the cutter employed. Such deviation results in unacceptable products. The plate together with the channels defines a series of chambers in which the material remains for sufficient time for the pressure prevailing upsteam of the nozzle to have built up in the chambers. Moulded portions are then removed from the chambers with the required dimensions for fish fingers or whatever other unit product is required.

The present invention relates to a further improvement of the known earlier extrusion process which makes it possible to take advantage of some of the principles of the above-mentioned recently published process, particularly the excellent quality of the moulded articles. Using the instant invention, continuous production of endless bars of quick-frozen foods from which the finished portions only need to be cut off is enabled, and this was not possible when an end plate was employed. The cross-section of the continuous bars thus shaped can be circular, elliptical, polygonal or of any other desired shape, for instance the shape of a fish.

According to the embodiment of the invention, it is even possible to produce moulded shapes of quick-frozen foodstuffs such as fish which are circular or tubular, i.e. they have a hollow space in the centre. The outer wall of this ring or tube can also be of any desired shape. The products according to the invention have the further advantage that the macro-structure of the shaped foodstuff remains largely unchanged. Despite extension shaping, e.g. into a ring or tube, the wall material therefore consists, for example, of fish muscle meat which still has substantially the same flaky structure for which fish meat is so very highly rated.

The process according to the invention, in essence, thus consists of a series of steps as follows: loading a pressure chamber with a sufficient amount of frozen food, preferably fish fillets to insure that about 80% of the cross-sectional area of the loading chamber is completely occupied by the frozen fish; forcing the frozen fish out of the loaded pressure chamber by a high pressure feeding means; e.g. a piston, into a restricted channel which is resistant to high pressure and has a cross-section which decreases from the inlet end to the discharge end and ultimately into a final shaping channel, which also is resistant to high pressure but has a relatively constant, e.g. cylindrical rectangular, polygonal or any other desired, cross-section. The high pressure feeding means must transmit pressure in a continuous fashion throughout the cross-section of the restricted channel with the minimum of working on the material as opposed to the amount of working transmitted by a screw conveyor. The process normally takes place at temperatures below about minus 6° C. preferably below minus 15° C., and particularly at minus 18° C. to minus 20° C. These low temperatures are necessary so that the ice content of the frozen fish will be high enough to insure that subsequent extrusion and shearing operations can be easily performed. The pressures developed in such an extrusion will be of the order of magnitude of about 100–450 atms (gauge), thus requiring a pressure resistant construction for all of the mechanical means disclosed.

It is thus to be noted that the process and equipment parameters are extremely critical in the production of a satisfactory product. By a satisfactory product is meant one that will be acceptable to the public. It has been applicants' experience in certain consumer tests that have been run that consumers have a preference for products which have a substantially undegraded structure, produced by the instant invention.

Undegraded structure means that the structure of the fish when initially cut and filleted is substantially the same as when the product is made into fish fingers by the instant process. While there are no chemical tests to determine exactly when a structure is undegraded a series of photomicrographs can be taken and by comparison of such photomicrographs structural degradation is quite evident. Thus one of the objects of this invention is to achieve a final moulded fish finger product having a muscle and cell structure which is substantially the same as the structure of a fish before undergoing the process. In order to do this a series of process parameters must be critically observed and these parameters include the pressure loading of the pressure chamber and temperature. Since the main purpose is to achieve a substantially undegraded product and the method of accomplishing this purpose is governed by the parameters mentioned above, the parameters necessarily inter-related. Generally, the more work that is performed on the fish structure the more the fish structure will be degraded. Accordingly, if the pressure is too high degradation of the fish structure will occur. In like manner, if the temperature is too low it will require an increase in the pressure necessary for extrusion and again the fish structure will be degraded. In this way, the extrusion pressure is related to temperature.

Loading the initial barrel or loading chamber to an amount of about 80% of its cross-sectional area before applying pressure to the fish insures that the fish will completely fill the channel upon application of the high pressures of extrusion utilized in the invention. If the channel is not completely filled, differential pressures will result between the pressurized product on different sides of any extrusion cutter utilized and damage the cutter. Further, if the fish were fully loaded into the barrel rather than only 80% of capacity, pressures are required which are too high to properly extrude the fish and which would degrade the fish structure. In addition, the passageway through which the fish is extruded is also critical.

The restrictive portion of the extrusion device will cause a certain amount of back pressure. The shaping channel after the restrictive portion, depending upon its length, will also cause a back pressure due to frictional forces between the walls of the shaping chamber and the fish being extruded. It has been found that the force generated between the walls of the relatively constant cross-sectional shaping chamber and the fish are principally peripheral forces which are much less degrading to the fish structure than the parabolic forces and differential extrusion forces which are encountered in a restrictive channel. Therefore, after leaving the restrictive channel, the remainder of the pressure or force imposed on the fish is a result of the length of the shaping chamber.

Generally then, as has been stated above, process parameters to achieve the aforementioned conditions of extrusion must be maintained. Temperatures between minus 6° and minus 30° C. insure that degradation of the fish structure does not occur. The pressures utilized on the fish structure must be from 100–400 atm. again to insure that the structure of the fish is not substantially degraded.

While it has been stated that a substantial part of the extrusion forces are applied to the fish by friction between the fish and the walls of the shaping channel, the restrictive channel is still necessary. It has been found that the restrictive channel should have a ratio of inlet to outlet of from 1.1:1 to 3:1, preferably within the limits of 1.3:1 to 2:1. This decrease in cross-section should desirably cover a distance of 0.5 to 10 cm, preferably 4 to 6 cm, in other words the angle of the pipe axis at the narrowest part should be about 10°–20°, preferably about 15°. A further extension piece having a substantially constant cross-section is advantageously connected to the final shaping channel to serve as a guide. This extension does not need to be pressure-resistant.

It should be mentioned at this point that extruders of somewhat similar dimensions are known for the extrusion of lightly frozen mince meat, for example U.S. Pat. No. 2,670,296 to Tansley, but neither the high pressures not low temperatures of the present invention are envisaged or even possible. Additionally, since the Tansley patent is concerned with only minced products maintenance of the product structure without substantial degradation is not attempted. Thus, the critical aspect of the instant invention which requires that the loading barrel have at least 80% of its cross-section filled with material has not been considered and in the case of the screw conveyor employed it is completely incapable of achieving this aspect.

A screw conveyor degrades the cellular structure by creating massive volume changes and hence excessive shear working. Also, it imparts a zone of weakness in products that have been treated. A finished fish finger, when treated with this type of conveyor, would thus have a tendency to break apart at the intervals corresponding to the high points of the screw. Applicants' high pressures and low temperatures enable a much more natural end product with sufficient retention of internal cohesion to enable subsequent mechanical working and to be produced with minimum loss of flavor and texture, particularly in the case of fish.

Sufficiently high pressure within the meaning of the invention is a pressure of at least 100 atm. (gauge) in the material being compressed; and the channel and other areas containing the material must be built sufficiently solidly for the radially applied stresses in the extruded material to be withstood without fracture of the material from which these components are constructed. In the processing of fatty materials such as red perch or halibut, or of pork or poultry, there is no particular advantage in exceeding this pressure of 100 atm. to any great extent, e.g. to more than 150 atm. (gauge) in the material being compressed. This may be due to the lubricity of the fatty material. In the processing of low fat meat material such as the flesh of cod or rock salmon or of beef, on the other hand, it is advantageous to apply even higher pressures of, say 180–450 atm. (gauge), preferably 200–300 atm (gauge) in the material being compressed.

The lower the shaping temperature the better the quality of the product obtained down to a certain temperature. The temperature of the total process is governed by production of an acceptable product which has no substantial degradation of its cellular and macrocellular structure. Additionally, the particular type of product material will, to a certain extent, govern the proper temperature. The temperature thus, should be sufficiently low to prevent unacceptable bacterial growth and to insure that the extruded end product has appropriate gross structural integrity to enable handling and, if desired, further mechanical working. On the other hand, the temperature should not be so low as to require pressures which will substantially degrade the structure of the product. The optimum temperature is reached at a shaping temperature of about $-18°$ C. to $-30°$ C., lower temperatures give no further advantages, but rather the disadvantage that the power consumption rises disproportionately during compressing. In order to insure that the optimum temperature range is not exceeded during the whole operation, particularly through the heat produced during the shaping work, the temperature of the outer wall of the pressure loading chamber, that of the restrictive channel and that of the shaping channel are each monitored and adjusted, i.e. usually appropriately cooled. The method of cooling is not critical and can be accomplished in any convenient manner known to the art, e.g. utilizing a jacketed apparatus.

For the success of the process according to the invention it is important not only to observe the above limits for the decrease in the cross-section but also to make the shaping channel with the constant cross-section sufficiently long.

The essential minimum length of the shaping channel depends to a certain extent on the temperature applied, the compression pressure, the compression speed and the nature of the foodstuff processed, but particularly on the quality demands made of the product produced, especially homogeneity and freedom from cracks. For example, in the processing of fish of high fat content with higher compression pressures, lower temperatures and a lower compression speed, the length can be kept somewhat shorter than for processing of fish of low fat content with a lower compression pressure, higher compression temperature and higher compression speed.

A length of less than 60 mm is inadequate even if the quality demands made of the product are modest, while a length considerably in excess of 200 mm gives no advantages and is therefore technically and economically pointless. If the length is excessive, wall friction requires greater extrusion pressures and this in turn creates heating problems. The preferred length of the pressure resistant shaping channel with a constant cross-section, according to the invention, is therefore 120–180 mm.

According to the particular embodiment of the invention suitable for the production of annular or tube shaped structures, a core is provided within an intermediate channel between the pressure loading chamber and the said restrictive channel. The final shaping channel still leads from the restrictive channel and has a constant cross-section over a given length, but reference to this constant cross-section is to be understood to refer to the whole cross-sectional area within the channel walls, including that occupied by the core which may extend partly into this channel. The shaping channel overall cross-section insures that the external surface of the extended material is appropriately shaped and polished, while the core does the same for the internal surface. It is advantageous if the cross-section of the intermediate channel increases upstream of the core, i.e. there is a restriction in the direction of flow. The core is connected to the pressure resistant outer wall of the channel by at least one, preferably several supports. These supports should not cover the whole length of the core. They should preferably only be provided on the initial part of the core, e.g. ⅓ of the way along towards the discharge end. In this embodiment it is unavoidable that the supports cut the product to be shaped, and a continuous bar would then not seem possible. It has been found, however, that by pressing the material through the restrictive channel tapering downstream of the supports the individual bars cut by the supports from the bar of the product can be reunited to form a continuous bar, which, unlike the bar upstream of the core is hollow on the inside. The criteria mentioned previously still apply to the restrictive channel under these conditions, i.e. the decrease in cross-section should be within the limits of 1.1:1 to 3:1, preferably 1.3:1 to 2:1 and should preferably cover a distance of 0.5 to 10 cm, preferably 4–6 cm. The merging of the individual bars to form a continuous hollow bar can be promoted by sharpening the supports connecting the core with the pressure resistant outer casing like a knife on the edge facing the discharge end.

A further improvement in the quality of the product can be achieved by making the edges of the supports facing the nozzle streamlined or drop-shaped.

Several embodiments of the process and apparatus according to the invention are described in greater detail below in examples with reference to the accompanying drawings in which:

FIGS. 1–4 relate to embodiments intended for producing moulded articles of solid cross-section.

FIGS. 5–7 illustrate an embodiment for the production of rings and tubular structures.

FIG. 1 is a longitudinal section through an apparatus according to the invention.

FIG. 2 is a cross-section along the lines II—II of FIG. 1.

FIG. 3 is a longitudinal section through another embodiment.

FIG. 4 is a cross-section along the line IV—IV of FIG. 3.

Whereas the cross-section of the bar along the line II—II or IV—IV corresponds to the ultimate cross-sectional shape, e.g. that of a fish, the cross-section along the line A—A is larger and of any desired shape, e.g. round or even rectangular, so that there is not only a tapering but also a changing of the cross-section.

The method of operation of the apparatus according to the invention will first be described schematically with the aid of FIGS. 1 and 2.

In a pressure loading chamber 1 is filled to at least 80% of the cross-sectional area as previously described with a frozen food, e.g. fish meat. The piston 2 presses the frozen food through a high pressure resistant restrictive channel 3 into the shaping channel 4 which is also high pressure resistant, to form a continuous bar 19, having its peripheral shape 4a determined by the cross-sectional shape of the shaping channel 4. The bar 19 is expediently not taken immediately into the open but conveyed via a guide channel 17 (which does not need to be pressure resistant) to the cutting station 20, where the continuous bar is cut into individual portions of the desired size. It is advantageous if the outside temperature of the pressure resistant wall 14 of the shaping channel is adjustable. This can be accomplished by using a jacket 18 on the apparatus. In most cases cooling is required for the temperature control, but—particularly after running for a long time—a certain heat infeed may be expedient, in order not to fall below the optimum temperature range for the shaping. Conventional heat exchange mediums at the desired temperature such as for example brine can be circulated through the jacket to adjust the temperature.

The apparatus according to FIGS. 3 and 4 operates in basically the same way as the apparatus of FIGS. 1 and 2. The difference from the embodiment illustrated in FIGS. 1 and 2 is mainly that in the case of the apparatus of FIGS. 3 and 4 several flat bars are formed simultaneously.

FIG. 5 is a longitudinal section, this time through an apparatus for the production of rings and tubes. The top half A illustrates a variant which, apart from the indispensable restrictive channel 3 prior to a final shaping channel 4 also has an intermediate channel 6 between the pressure loading chamber 1 and the restrictive channel 3; the bottom half B relates to an embodiment with a different form of intermediate channel.

FIG. 6 is a cross-section along the line VI—VI of FIG. 5. FIG. 7 is a section along the line VII—VII of FIG. 5.

In the embodiment of FIGS. 5 and 6 the quick frozen food is pressed from the pressure chamber 1 by the piston 2 at a pressure of at least 100 atm. (gauge) into the intermediate channel 16. The cross-section of the intermediate channel 16 decreases towards the discharge end. There is a core 5 in the intermediate channel 16. The core 5 is held by one or more supports 6 in the centre of the intermediate channel 16. As can be seen from FIG. 6, the core 5 in the example illustrated has two supports opposite each other. The supports 6 only run part of the way along the core 5. The supports 6 hold the core within a pressure resistant outer casing 14.

According to a preferred embodiment, the supports 6 are shaped like an airfoil section. Their edges 7 facing the discharge side are sharpened, whereas the edges 8 facing the inlet side are thick and rounded off in a drop shaped fashion cf. FIG. 7.

The core 5 in the intermediate channel 16 tapers towards the outlet. Its end 9 facing the inlet side is expediently rounded off. The end facing the discharge side can, on the other hand, be truncated. The intermediate channel 16 consists of a part 11 adjoining the pressure loading chamber 1 or a tapering part 3a, said part 11 tapering slightly towards the discharge end, surrounding the core 5 and extending beyond the supports 6. Adjoining this narrowed part 11 of the intermediate channel 16 it is advantageous to have a part 12 with a constant cross-section and dimension.

Leading from this part 12 there is a restrictive channel 3 which decreases in cross-section in the same manner as that described previously, i.e. the cross-section decreases in the ratio 1.1:1–3:1, preferably within the limits 1.3:1–2:1, the cross-section decrease expediently covering a length of 0.5–10 cm, preferably 4–6 cm, so that the angle to the pipe axis at the narrowest part is about 10°–20°, preferably about 15°.

In each case the end of the core 5 projects into an area of the device in which the external diameter of the bar 19 to be extruded is shaped by a final shaping channel 4 with a substantially constant diameter. Connected to the end piece, either direct or at a certain distance, there can be guide channel 17 which need not be pressure resistant, and the integral diameter of this guide channel 17 can also be somewhat larger than that of the pressure resistant shaping channel 4.

The cooling agent channels for the pressure chamber 1, the various parts of the shaping channel, and if necessary of the core, have not been illustrated in the drawing but conventional jacketing and channelling can be used.

The piston 2 presses the frozen food from the pressure loading chamber 1 into the shaping channel 4 through the restrictive part 3a. The rounded-off tip 9 of the core 5 penetrates the extruded bar, so that the bar becomes ring-shaped. The supports 6 cut this ring-shaped bar, but beyond the supports in the part 12, which has a constant cross-section, the cut portions of the ring coalesce again. The restrictive channel 3 not only promotes this coalescence but also strengthens the bar further. For instance, individual muscle fibres of an extruded meat can be pushed against each other in such a way that the dividing line made by the supports is no longer visible in the finished product. The ultimate cross-section of the extruded tubular bar is produced in the area of the pressure-resistant shaping channel 4 into which the end of the core 5 projects. In the shaping channel 4 there is a certain amount of pressure reduction in the extruded foodstuff, which up to this point has been under high pressure, but the external diameter and the smooth outer surface of the bar are retained. The non-pressure resistant guide channel 17 serves the purpose of guiding the bar to a certain extent after the actual extrusion and, for instance, prevents it from sagging or breaking off owing to its own weight.

EXAMPLE 1

In an extruder according to FIGS. 1 and 2, two kg of cod fillet is compressed for 0.21 minutes at a temperature of −18° C. and a pressure of 250 atm (gauge), measured in the material being compressed. The cross-section of the apparatus decreases from the pressure loading chamber 1 to the shaping channel 4 from 42 cm$^2$ over a distance of 4 cm to 17 cm$^2$. The emerging fish shaped bar 19 was cut into individual portions 12 cm thick.

EXAMPLE 2

In an apparatus according to FIGS. 3 and 4 chicken meat was compressed at a temperature of −15° C. and a pressure of 100 atm. (gauge). In this example the decrease in cross-section was 33.5%, from 42 cm$^2$ to 28 cm$^2$ over a distance of 1.5 cm. The conveyance speed of the two bars of chicken meat formed was 7.5 cm per second. The cross-section dimensions were twice 1.4 cm × 10 cm.

EXAMPLE 3

With an apparatus according to FIGS. 4–7 red perch fillet was compressed to the shape of a tube of which the external diameter was 4.4 cm and the internal diameter 2.8. An apparatus according to embodiment A, i.e. with a decrease in cross-section upstream of the shaping channel, was used. Cross-sectional decrease 3a was 10%, and in the narrow part 3 the cross-section was reduced from 20 cm$^2$ to 15.5 cm$^2$ over a distance of 5 cm. The length of the core was 18 cm; the pressure was 120 atm. (gauge). The output of the apparatus was 150 kg per hour.

This invention has been described with respect to certain preferred embodiments, and various modifications and variations in the light thereof will be suggested to persons skilled in the art and are to be included within the spirit and purview of this application and the scope of the appended claims.

What is claimed is:

1. A process for shaping frozen food while substantially retaining the cellular and muscular structure thereof to form a final frozen food product comprising:
   (a) loading said frozen food into a pressure chamber so that about 80% of the cross-sectional area of said chamber is completely occupied by said frozen food;
   (b) forcing said frozen food, at a temperature below about −6° C., by a high pressure feeding means into the inlet end of a restrictive channel, said channel being resistant to high pressure, and having a cross-section which decreases from said inlet end to a discharge end in a ratio of 1.1 to 1 to 3 to 1 over a distance of 0.5 to 10 cm;
   (c) extruding said frozen food through said restrictive channel and through a high pressure resistant shaping channel, at a pressure of about 100 to about 450 atmospheres (gauge) and sufficient to produce a back pressure of at least 100 atmospheres (gauge) in said shaping channel, said shaping channel being at least 6 cm long and having a relatively constant cross-section corresponding to the cross-sectional shape of said final product; and (d) adjusting the temperature of said frozen food to maintain therein a temperature of −6° C. to −30° C. throughout said process.

2. A process according to claim 1 wherein said temperature is maintained at −18° to −20° during said process.

3. A process according to claim 1 in which low-fat material is shaped at pressures within said material of between 180 and 450 atm. (gauge).

4. A process according to claim 3 in which the pressures are in the range 200 to 300 atm.

* * * * *